United States Patent [19]
Roettgen et al.

[11] Patent Number: 5,752,482
[45] Date of Patent: May 19, 1998

[54] SYSTEM FOR INTEGRALLY CONTROLLING CURRENT FLOW THROUGH NUMBER OF INDUCTIVE LOADS

[75] Inventors: Leslie A. Roettgen; Robert S. Henrich; William D. Meyer, all of Columbus; Bryce D. Himebaugh, Bloomington, all of Ind.

[73] Assignee: Cummins Engine Company, Inc., Columbus, Ind.

[21] Appl. No.: 828,356

[22] Filed: Mar. 28, 1997

[51] Int. Cl.$^6$ ............................................. F02D 13/00
[52] U.S. Cl. .................................................. 123/322
[58] Field of Search ............................. 123/322, 320, 123/321, 347, 348; 361/154; 323/222

[56] References Cited

U.S. PATENT DOCUMENTS

| | | | |
|---|---|---|---|
| 4,158,348 | 6/1979 | Mason et al. | 123/322 |
| 4,338,651 | 7/1982 | Henrich | 123/322 |
| 4,950,974 | 8/1990 | Pagano | 123/322 |
| 4,992,836 | 2/1991 | Sicard | 123/322 |
| 5,603,300 | 2/1997 | Feucht et al. | 123/322 |
| 5,615,653 | 4/1997 | Faletti et al. | 123/322 |
| 5,634,446 | 6/1997 | Rauznitz et al. | 123/322 |
| 5,634,447 | 6/1997 | Rowells | 123/322 |
| 5,647,319 | 7/1997 | Uehara et al. | 123/322 |
| 5,676,109 | 10/1997 | Eisenbacher et al. | 123/322 |
| 5,680,841 | 10/1997 | Hu | 123/322 |

Primary Examiner—Raymond A. Nelli
Attorney, Agent, or Firm—Woodard, Emhardt, Naughton, Moriarty & McNett

[57] ABSTRACT

A load driver system for integrally controlling the flow of current through a number of inductive loads of an internal combustion engine, particularly the flow of current through a fuel injector solenoid and an engine brake solenoid during the operation of an engine cylinder, is provided. In one embodiment of the load driver system, a single multiplexed high side driver is connected to inputs of both solenoids, and separate low side drivers are connected to outputs of each of the solenoids. In an alternative embodiment, separate high side drivers are connected to inputs of each of the solenoids, and a single multiplexed low side driver is connected to the outputs of the solenoids. In another alternative embodiment, a single multiplexed high side driver is connected to the input of the fuel injector solenoid, the input of the engine brake solenoid is connected to the output of the fuel injector solenoid, and separate low side drivers sharing a common sense resistor are connected to outputs of each of the solenoids.

62 Claims, 6 Drawing Sheets

5,752,482

1

SYSTEM FOR INTEGRALLY CONTROLLING CURRENT FLOW THROUGH NUMBER OF INDUCTIVE LOADS

FIELD OF THE INVENTION

The present invention relates generally to a system for integrally controlling current flow through a number of inductive loads, and more specifically to such a system for integrally controlling such current flow through an injector solenoid and an engine brake solenoid during each operational cycle of a cylinder.

BACKGROUND OF THE INVENTION

Electronic fuel injectors are known and widely used for controlling fuel delivery to internal combustion engines, including diesel engine such as those used in medium and heavy duty trucks. Electronic systems for controlling such fuel injector operation typically include a number of load driving devices responsive to precisely timed control signals to control current flow through the injector solenoids.

Many heavy duty trucks are further equipped with engine braking capability wherein the engine exhaust valves are opened during the compression and power strokes to retard vehicle speed as is known in the art. Such engine braking systems typically include a number of solenoid activated actuators operable to enable the engine exhaust valves as needed. Electronic systems for controlling such engine braking operation may also include a number of load driving devices responsive to precisely timed control signals to control current flow through the number of engine brake solenoids.

Since fuel injection and engine braking operation are typically managed and controlled by different subsystems of the vehicle, fuel injector solenoid and engine brake solenoid control/driver circuits are typically provided as separate, or stand alone, solenoid driver circuits or subsystems. An example of one known vehicle or engine control system 10 which includes independent driver circuits for separately controlling current flow through a fuel injector solenoid and an engine brake solenoid is shown in FIG. 1. Referring to FIG. 1, system 10 includes two separate inductive loads 12 and 14, wherein load 12 represents a fuel injector solenoid having a load input 30 and a load output 46, and load 14 represents an engine brake solenoid having a load input 72 and a load output 78.

The fuel injector drive/control circuitry includes a load driving device 16, typically a MOS-type power transistor, having a gate 18 connected to an output OP1 of a control circuit 20. One leg 22 of device 16 is connected to a source of electrical power 24, which is typically the vehicle battery. The other leg 26 of device 16 is connected to an anode of a diode 28, the cathode of which is connected to input 30 of fuel injector solenoid 12. The input 30 of fuel injector solenoid 12 is also connected to the cathode of another diode 32, the anode of which is connected to a ground reference, and is further connected to a diagnostics input D1 of control circuit 20 via circuit path 34.

A second load driving device 36, again typically a MOS-type power transistor, has a gate 38 connected to an output OP2 of control circuit 20. One leg 40 of device 36 is connected to a source of boost electrical power 42, typically having a voltage value much larger than battery voltage. The other leg 44 of device 36 is connected to input 30 of fuel injector solenoid 12.

The output 46 of fuel injector solenoid 12 is connected to one leg 48 of a third load driving device 50, again typically

2 a MOS-type power transistor, having a gate 52 connected to an output OP3 of control circuit 20. The other leg 54 of device 50 is connected to one end of a resistor 56, the opposite end of which is connected to the ground reference. Circuit path 58 connects the leg 54 of device 50 to a feedback input D2 of control circuit 20. A forward biased diode 60 in series with a zener diode 62 are connected between leg 48 and gate 52 of device 50, as is known in the art, to guard against so-called inductive flyback effects.

The engine brake solenoid drive/control circuitry includes a load driving device 64, typically a MOS-type power transistor, having a gate 66 connected to an output OP4 of control circuit 20. One leg 68 of device 64 is connected to a source of electrical power 24, which is typically the vehicle battery, and the other leg 70 is connected to the input 72 of engine brake solenoid 14. Leg 70 is also connected to the cathode of a diode 74, the anode of which is connected to ground potential, and further to a diagnostics input D3 of control circuit 20 via circuit path 76.

Output 78 of engine brake solenoid 14 is connected to one leg 80 of another load driving device 82, again typically a MOS-type power transistor, having a gate 84 connected to an output OP5 of control circuit 20. The other leg 86 of device 82 is connected to one end of a resistor 88, the opposite end of which is connected to the ground reference, and to a feedback input D4 of control circuit 20. As with device 50, load driving device 82 includes series connected forward biased diode 60 and zener diode 62 between leg 80 and gate 84 thereof.

In the operation of system 10, the various load driving devices described hereinabove are responsive to control signals provided by control circuit 20 at outputs OP1–OP5 to separately control the current Ia through fuel injector solenoid 12 and the current Ib through the engine brake solenoid 14. Each of the solenoids 12 and 14 include a high-side driver operable to direct current flow to the solenoid inputs 30 and 72 and a low-side driver operable to direct current from the solenoid outputs 46 and 78 to a ground reference through resistors 56 and 88 respectively. As is known in the art, resistors 56 and 88 are low-valued resistors and are provided to develop a small sense voltage thereacross proportional to the currents Ia and Ib flowing therethrough. Via feedback circuit paths 58 and 90, control circuit 20 is operable to monitor the amount of current flow through solenoids 12 and 14 and adjust the gate drive voltages at outputs OP1 and OP3–OP5 to limit the currents Ia and Ib flowing through inductive loads 12 and 14 as is known in the art.

It is often important, particularly with respect to fuel injector solenoid 12, that the current flowing therethrough have a fast rise time to a peak current. For this reason, load driving device 36 is connected to a high boost voltage 42, and is activated at the beginning of each fuel injector pulse to ensure a fast rise time in the current Ia. Diodes 28, 32 and 74 are operable to provide current paths to solenoids 12 and 14 when either of the source voltages 24 and 42 are turned off by load driving devices 16, 36 and 64 during the current limiting portion of currents Ia and Ib as is known in the art.

Referring now to FIGS. 2–5, four general cases of fuel injector and engine brake control are illustrated. A first general case is illustrated in FIG. 2 which shows a combustion mode of engine operation 92 wherein a fuel injector signal 94 is active between times $t_1$–$t_2$ while an engine brake signal 96 remains inactive. Alternatively, the engine brake signal could be active at all times other than between $t_1$ and $t_2$. In either case, fuel injector and engine brake activation times are mutually exclusive and control signals representative of fuel injector signal 94 are produced at outputs OP1–OP3 of control circuit 20 between $t_1$ and $t_2$, and load driving devices 16, 36 and 50 are responsive thereto to control the flow of current Ia through fuel injector solenoid 12 as discussed hereinabove.

A second general case of fuel injector and engine brake control is illustrated in FIG. 3 which shows an engine brake mode of engine operation 98 wherein the fuel injector signal 94 remains inactive while the engine brake solenoid signal 96 is active between times $t_3$–$t_4$. Alternatively, the fuel injector solenoid could be active at all times other than between $t_3$ and $t_4$. In either case, fuel injector and engine brake activation times are mutually exclusive and control signals representative of engine brake signal 96 are produced at outputs OP4–OP5 of control circuit 20 between $t_3$ and $t_4$, and load driving devices 64 and 82 are responsive thereto to control the flow of current Ib through engine brake solenoid 14 as discussed hereinabove.

The first and second general cases of fuel injector and engine brake control illustrated in FIGS. 2 and 3 are directed to the active control one solenoid during time periods when the other solenoid is inactive. Conversely, the third and fourth general cases illustrated in FIGS. 4 and 5 are directed to simultaneous and partially simultaneous control of the activation times of each of the two signals 94 and 96. Referring to FIG. 4, a third general case of fuel injector and engine brake control is illustrated for an engine braking mode of engine operation 98 wherein the time window $t_1$–$t_2$ at which the fuel injector signal 94 is active partially overlaps the time window $t_3$–$t_4$ at which the engine brake signal 96 is active. Referring to FIG. 5, a fourth general case of fuel injector and engine brake control is illustrated for an engine braking mode of engine operation 98 wherein the time window $t_1$–$t_2$ at which the fuel injector signal 94 is active and the time window $t_3$–$t_4$ at which the engine brake signal 96 is active are completely overlapping. In either case, the fuel injector solenoid driving circuitry and the engine brake solenoid driving circuitry are separately and independently controlled by control circuit 20, as discussed hereinabove, to control the flow of current Ia through fuel injector solenoid 12 and the flow of current Ib through engine brake solenoid Ib.

While the foregoing control and inductive load driving circuitry 10 illustrated in FIG. 1 has been widely accepted for use in controlling an internal combustion engine, it has inherent drawbacks associated therewith. For example, each solenoid 12 and 14 has separate and dedicated load driving circuitry associated therewith which is expensive, both monetarily and in terms of space consumption within the engine control system or module. Further, the control circuit 20 must be operable to produce separate, and typically redundant, control signals for the control of each solenoid. Moreover, additional complexity is added to both the load driving circuitry and the control circuit 20 when providing for the feedback of diagnostic information from the load driving circuitry to control circuit 20. These problems are greatly magnified if control and inductive load driving circuitry 10 is provided for each cylinder of the engine.

What is therefore needed is a technique and circuit arrangement for controlling the flow of current through a number of inductive loads, such as a fuel injector solenoid and an engine brake solenoid, which does not suffer from any of the drawbacks associated with prior art techniques and circuit arrangements. Such a technique and circuit arrangement should preferably have as goals, economy of circuitry, avoidance of sensor/information duplication, a system approach for the implementation of "individual cylinder" control and a system approach for the use of diagnostic information.

SUMMARY OF THE INVENTION

The inductive load driver system of the present invention addresses and overcomes the foregoing drawbacks of prior art engine brake and fuel injector control circuits and systems. In accordance with the present invention, a load driver system is operable to integrally control the flow of current from a source of electrical power through first and second inductive loads such as a fuel injector solenoid and an engine brake solenoid.

A first embodiment of the load driver system of the present invention includes a first switching device adapted for connection to the source of electrical power and to inputs of the first and second inductive loads. The first switching device is responsive to a first control signal to connect the source of electrical power to inputs of the first and second inductive loads. A second switching device is adapted for connection to an output of the first inductive load and coupled to a ground reference, and is responsive to a second control signal to couple the first inductive load output to the ground reference. A third switching device is adapted for connection to an output of the second inductive load and coupled to the ground reference. The third switching device is responsive to a third control signal to couple the second inductive load output to the ground reference.

A second embodiment of the load driver system of the present invention includes a first switching device adapted for connection to the source of electrical power and to an input of the first inductive load, wherein the first switching device is responsive to a first control signal to connect the source of electrical power to the first inductive load input. A second switching device is adapted for connection to the source of electrical power and to an input of the second inductive load, wherein the second switching device is responsive to a second control signal to connect the source of electrical power to the second inductive load input. A third switching device is adapted for connection to outputs of the first and second inductive loads and connected to a ground reference. The third switching device is responsive to a third control signal to connect the first and second inductive load outputs to the ground reference.

A third embodiment of the load driver system of the present invention includes a first switching device adapted for connection to the source of electrical power and to an input of the first inductive load, wherein the first switching device is responsive to a first control signal to connect the source of electrical power to the inductive load input. A second switching device is adapted for connection to an output of the first inductive load and to an input of the second inductive load, and is coupled to a ground reference. The second switching device is responsive to a second control signal to couple the first inductive load output to the ground reference. A third switching device is adapted for connection to an output of the second inductive load and is coupled to the ground reference. The third switching device is responsive to a third control signal to couple the second inductive load output to the ground reference.

One object of the present invention to provide a load driver system for integrally controlling the flow of current through both a fuel injector solenoid and an engine brake solenoid of a cylinder during each operational cycle of the engine.

Another object of the present invention is to provide such a load driver system wherein a single high side driver is connected to all solenoid inputs for multiplexed control of current flow therethrough.

Yet another object of the present invention is to provide such a load driver system wherein a single low side driver is connected to all solenoid outputs for multiplexed control of current flow therethrough.

Still another object of the present invention is to provide such a load driver system wherein a single high side driver is connected to an input of a first solenoid, the output of which is connected to the input of a second solenoid, for multiplexed control of current flow therethrough.

These and other advantages of the present invention will become more apparent from the following description of the preferred embodiments.

DESCRIPTION OF THE PREFERRED EMBODIMENTS

Figure 1:
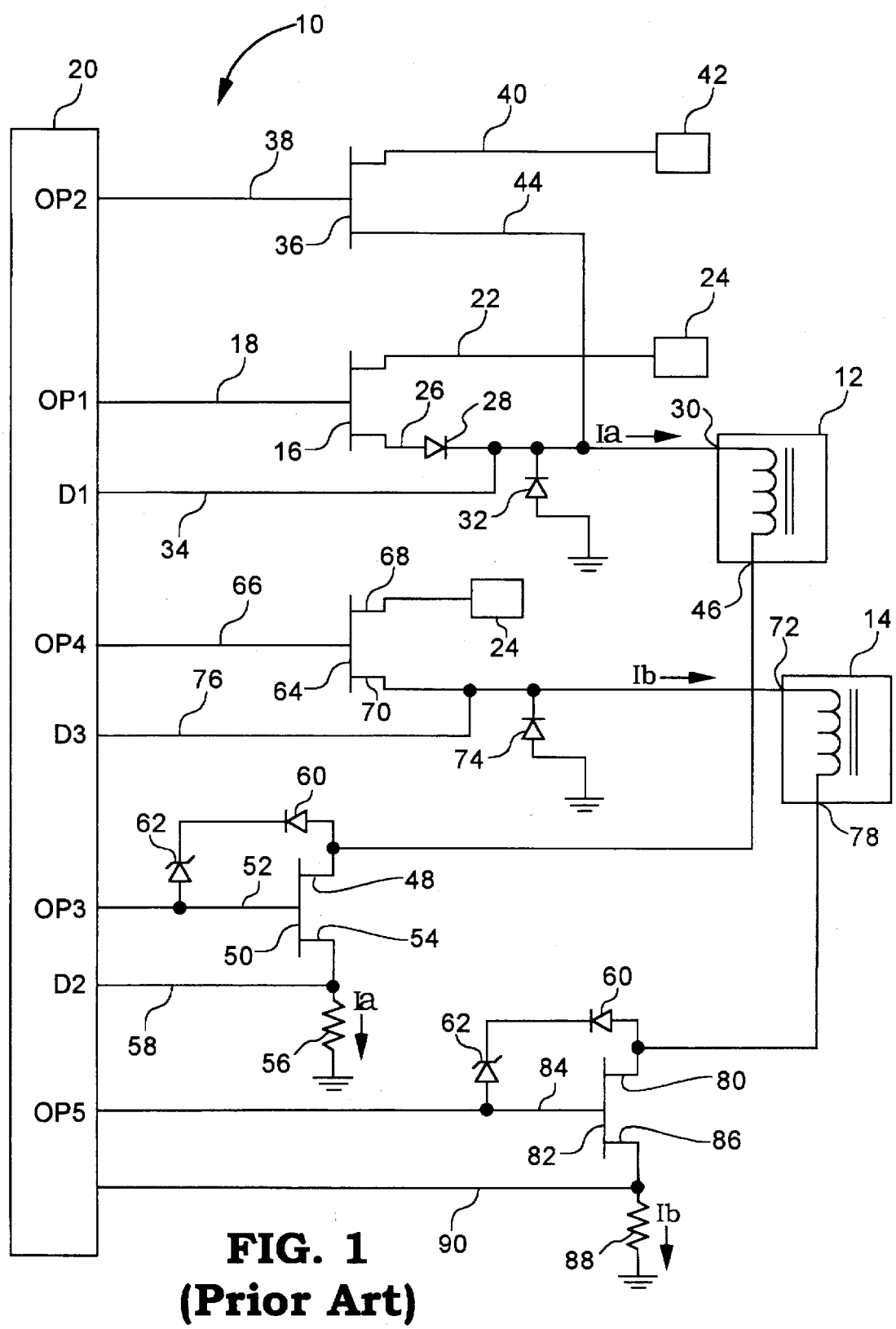
FIG. 1 illustrates a known circuit for separately driving a fuel injector solenoid and an engine brake solenoid of an internal combustion engine.
Figure 2:
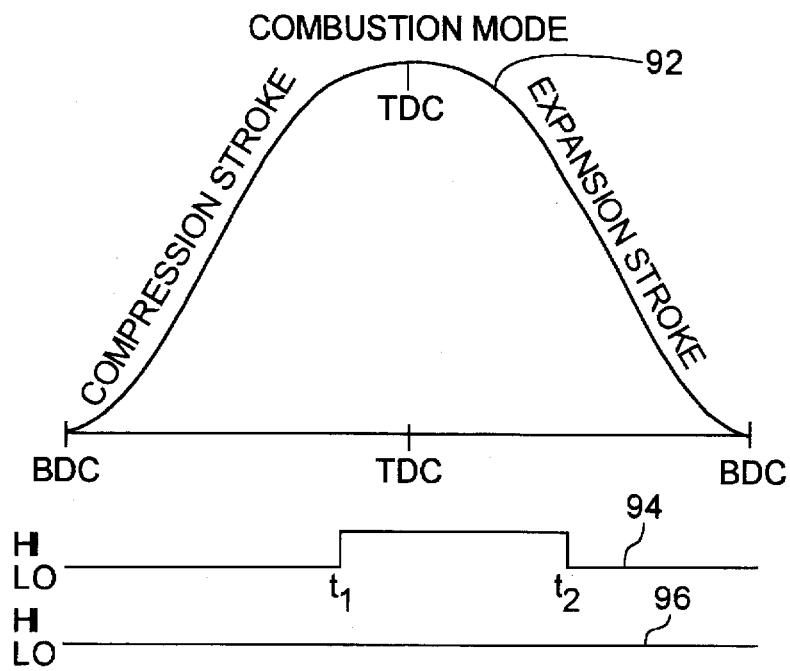
FIG. 2 illustrates a known technique for driving the fuel injector solenoid of FIG. 1 while inhibiting engine brake operation.
Figure 3:
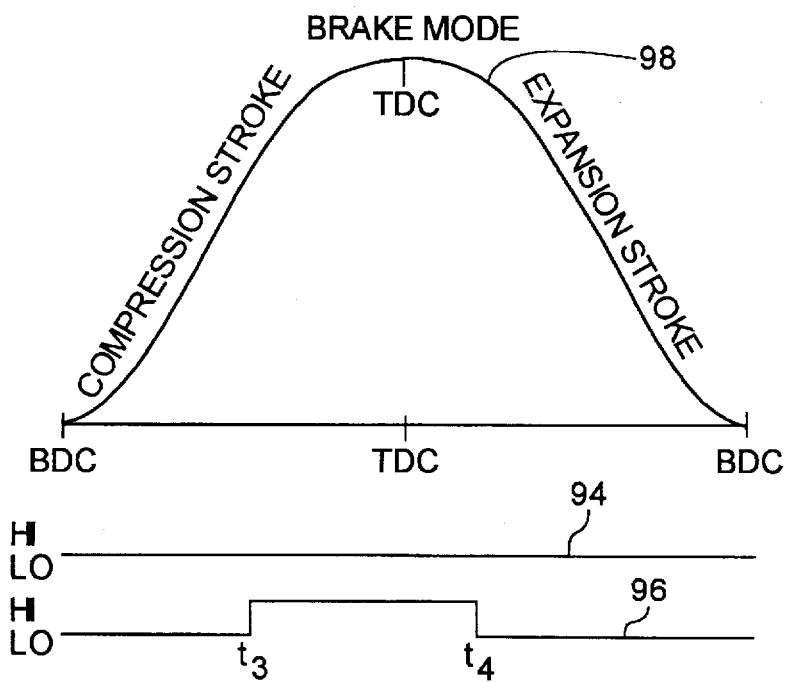
FIG. 3 illustrates a known technique for driving the engine brake solenoid of FIG. 1 while inhibiting fuel injector operation.
Figure 4:
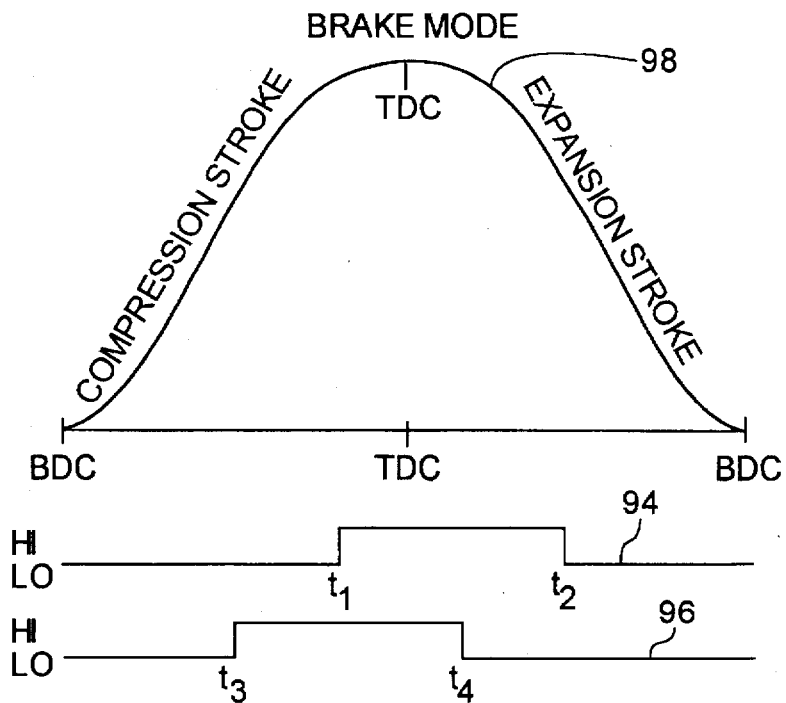
FIG. 4 illustrates a known technique for driving the fuel injector and engine brake solenoids of FIG. 1 during partially overlapping operation thereof.

For the purposes of promoting an understanding of the principles of the present invention, reference will now be made to the embodiments illustrated in the drawings and specific language will be used to describe the same. It will nevertheless be understood that no limitation of the scope of the present invention is thereby intended, such alterations and further modifications in the illustrated systems, and such further applications of the principles of the present invention as illustrated therein being contemplated as would normally occur to one skilled in the art to which the present invention relates.

Figure 5:
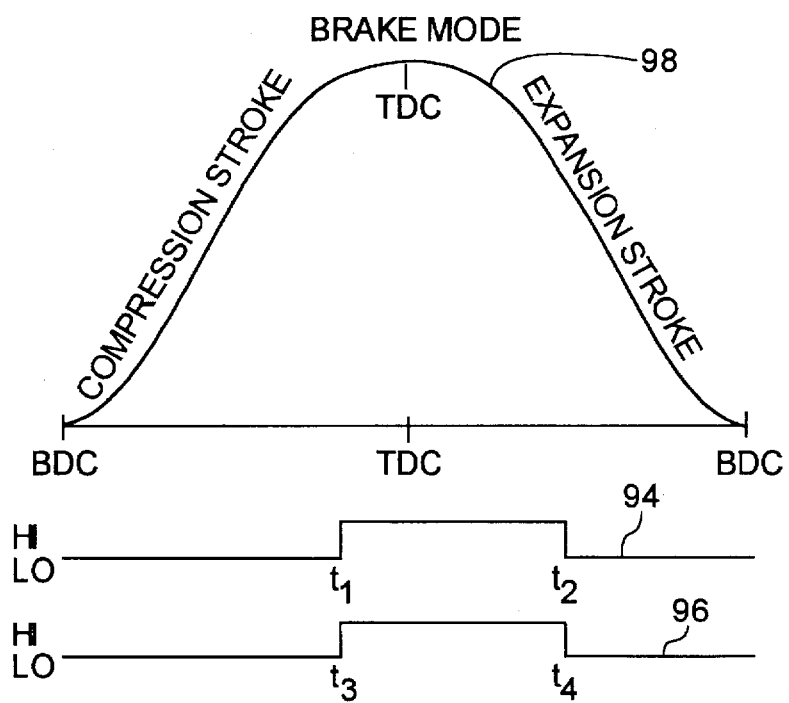
FIG. 5 illustrates a known technique for driving the fuel injector and engine brake solenoids of FIG. 1 during overlapping operation thereof.
Figure 6:
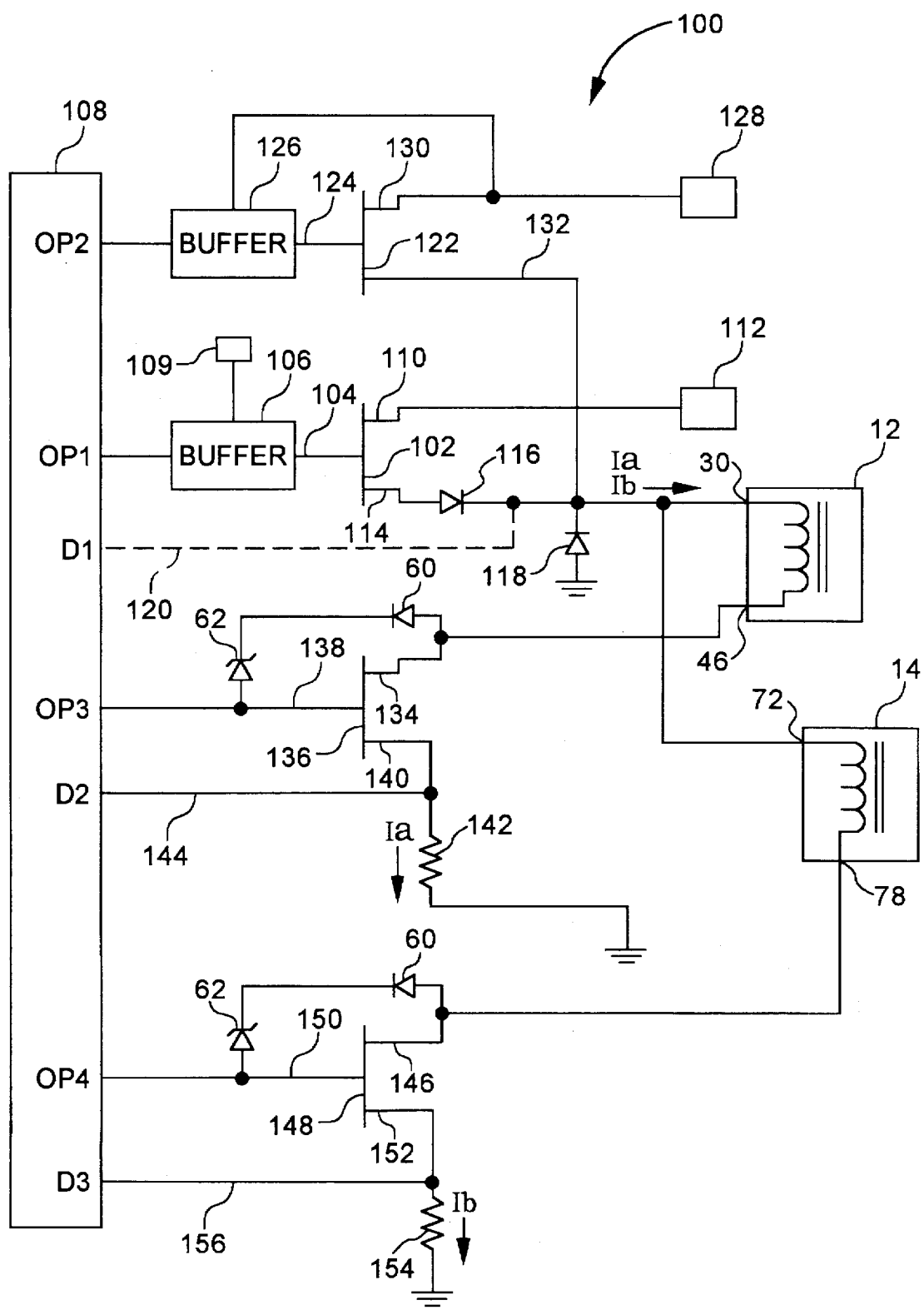
FIG. 6 illustrates a circuit diagram of one preferred embodiment of an inductive load driver system in accordance with the present invention.

Referring now to FIG. 6, one preferred embodiment of load driver system 100 for integrally controlling current flow through a number of inductive loads, in accordance with the present invention, is shown. System 100 includes a first inductive load 12, preferably a fuel injector solenoid, having a load input 30 and a load output 46, and a second inductive load 14, preferably an engine brake solenoid, having a load input 72 and a load output 78. As will be described in greater detail hereinafter, load driver system 100 is operable to drive the fuel injector solenoid 12 and engine brake solenoid 14 in accordance with any of the four general cases illustrated in FIGS. 2–5.

System 100 further includes a first switching device 102, preferably a MOS-type transistor, having a gate 104 connected to an output of a buffer circuit 106. An input of the buffer circuit 106 is connected to an output OP1 of a control circuit 108, and the buffer circuit 106 is connected to a first source of electrical power 109. One leg 110 of switching device 102 is connected to a second source of electrical power 112, which is preferably an automotive battery operable to produce battery voltages in the range of between approximately 7–24 volts. It is to be understood, however, that power source 112 may be any known power source capable of driving solenoids 12 and 14.

Buffer circuit 106 is provided to convert the low-level control signal voltage produced by control circuit 108 at output OP1 to a suitable activation voltage for driving the gate 104 of switching device 102 which has electrical power source 112 connected to leg 110 thereof. Device 102 is preferably an n-channel MOSFET, and the source of electrical power 109 must therefore provide a voltage slightly higher in value than the voltage provided by electrical power source 112, as is known in the art, to suitably drive gate 104 of switching device 102.

The other leg 114 of switching device 102 is connected to an anode of a blocking diode 116, the cathode of which is connected to input 30 of fuel injector solenoid 12 and to input 72 of engine brake solenoid 14. Inputs 30 and 72 are also connected to the cathode of a recirculating diode 118, the anode of which is connected to a ground reference, and optionally to a diagnostics input D1 of control circuit 108 via circuit path 120 which is shown in phantom. Via circuit path 120, control circuit 108 is thus operable to monitor at input D1 the voltage present at either one, or both of, inputs 30 and 72 of fuel injector solenoid 12 and engine brake solenoid 14 respectively.

System 100 further includes a second switching device 122, preferably a MOS-type transistor, having a gate 124 connected to an output of another buffer circuit 126. An input of the buffer circuit 126 is connected to an output OP2 of control circuit 108, and the buffer circuit 126 is connected to a third source of electrical power 128. One leg 130 of switching device 122 is also connected to the third source of electrical power 128. Preferably, the third source of electrical power produces a boost voltage having a value much larger than that of the second source of electrical power 112, and which may be produced by a charged capacitor or other voltage source. In one embodiment, the third source of electrical power produces a voltage of at least 100 volts.

Buffer circuit 126, like buffer circuit 106, is provided to convert the low-level control signal voltage produced by control circuit 108 at output OP2 to a suitable activation voltage for driving the gate 124 of switching device 122 which has electrical power source 128 connected to leg 130 thereof. Device 122 is preferably a p-channel MOSFET, and the gate 124 thereof must therefore have a gate voltage of at least the boost voltage in order to drive switching device 122 to an off state.

The other leg 132 of switching device 122 is connected to inputs 30 and 72 of fuel injector solenoid 12 and engine brake solenoid 14 respectively. As discussed in the BACKGROUND section, switching device 122 is provided to supply a boost voltage to fuel injector solenoid 12 at least during initial ramping of the load current therethrough, in order to minimize the peak current rise time as is known in the art. An added benefit of the system 100 of the present invention is that the boost voltage provided by switching device 122 may also be applied to the engine brake solenoid 14 if desired.

Switching devices 102 and 122 are responsive to control signals provided by control circuit 108 at outputs OP1 and OP2 thereof to supply a load current having a maximum value of Ia+Ib, corresponding to the load current Ia demanded by fuel injector solenoid 12 plus the load current Ib demanded by engine brake solenoid 14. It should be pointed out that, by multiplexing the high-side switching devices 102 and 122, system 100 provides a reduction in switching devices over known inductive load driving systems, and provides the further benefit of making a boost voltage available to engine brake solenoid 14.

The output 46 of fuel injector solenoid 12 is connected to one leg 134 of a third switching device 136, preferably a MOS-type transistor, having a gate 138 connected to output OP3 of control circuit 108. The other leg 140 of switching device 136 is connected to one end of a resistor 142, the opposite end of which is connected to the ground reference. Leg 140 is further connected to a feedback input D2 of control circuit 108 via circuit path 144. A series connected forward biased diode 60 and zener diode 62 are connected between leg 134 and gate 138 of switching device 136, as discussed in the BACKGROUND section, to provide inductive flyback protection for device 136.

The output 78 of engine brake solenoid 14 is connected to one leg 146 of a fourth switching device 148, preferably a MOS-type transistor, having a gate 150 connected to output OP4 of control circuit 108. The other leg 152 of switching device 148 is connected to one end of a resistor 154, the opposite end of which is connected to the ground reference. Leg 152 is further connected to a diagnostics input D3 of control circuit 108 via circuit path 156. A series connected forward biased diode 60 and zener diode 62 are connected between leg 146 and gate 150 of switching device 148, as discussed in the BACKGROUND section, to provide inductive flyback protection for device 148.

In accordance with one preferred embodiment of the present invention, system 100 provides load driving capability for a number of inductive loads wherein a common high side drive is used to supply load current to each of the inductive loads. Switching devices 102 and 122 are responsive to control signals provided by control circuit 108 at outputs OP1 and OP2 thereof to supply current from electrical power sources 112 and 128 to the inputs 30 and 72 of fuel injector solenoid 12 and engine brake solenoid 14 respectively. Switching device 136 is responsive to a control signal provided by control circuit 108 at output OP3 to provide a current path for the fuel injector solenoid current Ia through resistor 142 to the ground reference. Likewise, switching device 148 is responsive to a control signal provided by control circuit 108 at output OP4 to provide a current path for the engine brake solenoid current Ib through resistor 154 to the ground reference. Resistors 142 and 154 are included to provide voltages to feedback inputs D2 and D3 respectively that are proportional to the currents Ia and Ib respectively flowing therethrough, as discussed in the BACKGROUND section.

The system 100 of FIG. 6 may be used to control current flow through fuel injector solenoid 12 and engine brake solenoid 14 according to any of the four general solenoid control/drive examples illustrated in FIGS. 2–5. Those skilled in the art will recognize that while MOS-type transistors are preferably used as the switching devices 102, 122, 136 and 148, such switching devices may be alternatively be provided as bipolar transistors, junction field effect transistors (JFETs) or hybrid type transistors such as insulated gate bipolar transistors (IGBTs), or as any other known switching devices, wherein such switching devices are designed or chosen such that they are capable of handling load currents Ia and Ib. Control circuit 108 is preferably a circuit or subsystem responsive to a number of operational conditions associated with the engine to provide control signals at outputs OP1–OP4 indicative of fuel injector and engine brake operation. Control circuit 108 may be, or include, for example an interface circuit responsive to a control circuit connected thereto, a logic circuit responsive to a number of control signals, or a microprocessor-based control circuit, such as a vehicle and/or engine control computer, operable to process engine operational data and produce control signals in accordance therewith at outputs OP1–OP4.

Figure 7:
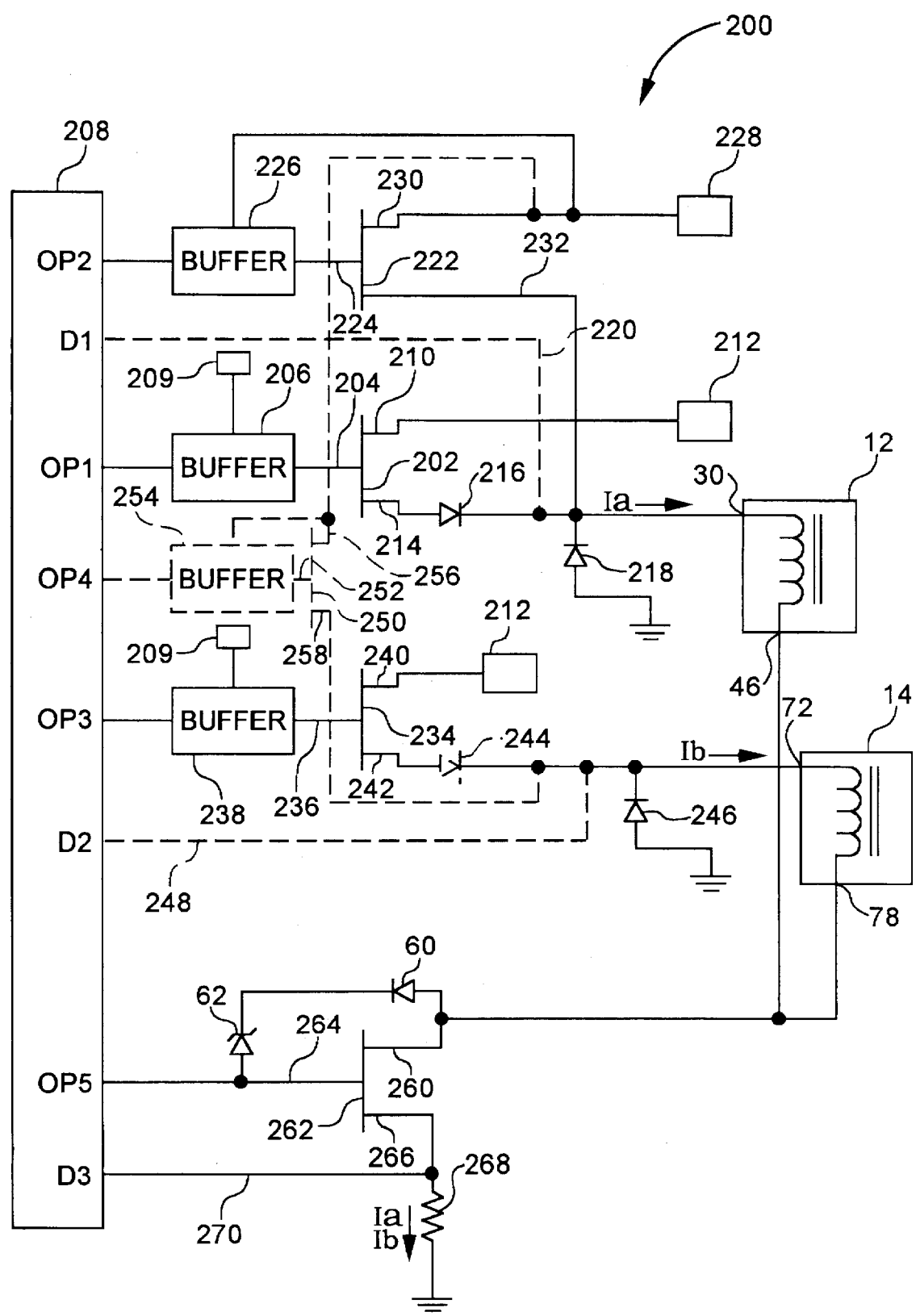
FIG. 7 illustrates a circuit diagram of an alternate embodiment of an inductive load driver system in accordance with the present invention.

Referring now to FIG. 7, another preferred embodiment of load driver system 200 for integrally controlling current flow through a number of inductive loads, in accordance with the present invention, is shown. System 200 includes a first inductive load 12, preferably a fuel injector solenoid, having a load input 30 and a load output 46, and a second inductive load 14, preferably an engine brake solenoid, having a load input 72 and a load output 78. As will be described in greater detail hereinafter, load driver system 200 is operable to drive the fuel injector solenoid 12 and engine brake solenoid 14 in accordance with any of the four general cases illustrated in FIGS. 2–5.

System 200 further includes a first switching device 202, preferably a MOS-type transistor, having a gate 204 connected to an output of a buffer circuit 206. An input of the buffer circuit 206 is connected to an output OP1 of a control circuit 208, and the buffer circuit 206 is connected to a first source of electrical power 209. One leg 210 of switching device 202 is connected to a second source of electrical power 212, which is preferably an automotive battery operable to produce battery voltages in the range of between approximately 7–24 volts. It is to be understood, however, that power source 212 may be any known power source capable of driving solenoids 12 and 14.

Buffer circuit 206, like buffer circuit 106 of FIG. 6, is provided to convert the low-level control signal voltage produced by control circuit 208 at output OP1 to a suitable activation voltage for driving the gate 204 of switching device 202 which has electrical power source 212 connected to leg 210 thereof. Device 202 is preferably an n-channel MOSFET, and the source of electrical power 209 must therefore provide a voltage slightly higher in value than the voltage provided by electrical power source 212, as is known in the art, to suitably drive gate 204 of switching device 202.

The other leg 214 of switching device 202 is connected to an anode of a blocking diode 216, the cathode of which is connected to input 30 of fuel injector solenoid 12. Input 30 is also connected to the cathode of a recirculating diode 218, the anode of which is connected to a ground reference, and optionally to a diagnostics input D1 of control circuit 208 via circuit path 220 which is shown in phantom. Via circuit path 220, control circuit 208 is thus operable to monitor at input D1 the voltage present at input 30 of fuel injector solenoid 12.

System 200 further includes a second switching device 222, preferably a MOS-type transistor, having a gate 224 connected to an output of another buffer circuit 226. An input of the buffer circuit 226 is connected to an output OP2 of control circuit 208, and the buffer circuit 226 is connected to a third source of electrical power 228. One leg 230 of switching device 222 is also connected to the third source of electrical power 228. Preferably, the third source of electrical power produces a boost voltage having a value much larger than that of the second source of electrical power 212, and which may be produced by a charged capacitor or other voltage source. In one embodiment, the third source of electrical power produces a voltage of at least 100 volts.

Buffer circuit 226, like buffer circuit 206, is provided to convert the low-level control signal voltage produced by control circuit 208 at output OP2 to a suitable activation voltage for driving the gate 224 of switching device 222 which has electrical power source 228 connected to leg 230 thereof. Device 222 is preferably a p-channel MOSFET, and the gate 224 thereof must therefore have a gate voltage of at least the boost voltage in order to drive switching device 222 to an off state.

The other leg 232 of switching device 222 is connected to input 30 of fuel injector solenoid 12. As discussed hereinabove, switching device 222 is provided to supply a boost voltage to fuel injector solenoid 12 at least during initial ramping of the load current therethrough, in order to minimize the peak current rise time as is known in the art. Switching devices 202 and 222 are responsive to control signals provided by control circuit 208 at outputs OP1 and OP2 thereof to supply a load current Ia corresponding to that demanded by fuel injector solenoid 12.

System 200 further includes a third switching device 234, preferably a MOS-type transistor, having a gate 236 connected to an output of a buffer circuit 238. An input of the buffer circuit 238 is connected to an output OP3 of a control circuit 208, and the buffer circuit 238 is connected to the first source of electrical power 209. One leg 240 of switching device 234 is connected to the second source of electrical power 212, and the other leg 242 is optionally connected to an anode of a blocking diode 244 (shown in phantom), the cathode of which is connected to input 72 of engine brake solenoid 14. Input 72 is also connected to the cathode of a recirculating diode 246, the anode of which is connected to a ground reference, and optionally to a diagnostics input D2 of control circuit 208 via circuit path 248 which is shown in phantom. Via circuit path 248, control circuit 208 is thus operable to monitor at input D2 the voltage present at input 72 of engine brake solenoid 14.

Buffer circuit 238, like buffer circuit 206, is provided to convert the low-level control signal voltage produced by control circuit 208 at output OP3 to a suitable activation voltage for driving the gate 236 of switching device 234 which has electrical power source 212 connected to leg 240 thereof. As with device 202, device 234 is preferably an n-channel MOSFET, and the source of electrical power 209 must therefore provide a voltage slightly higher in value than the voltage provided by electrical power source 212, as is known in the art, to suitably drive gate 236 of switching device 234.

System 200 may optionally include a fourth switching device 250 (shown in phantom), preferably a MOS-type transistor, having a gate 252 connected to an output of yet another buffer circuit 254 (also shown in phantom). An input of the buffer circuit 254 is connected to an output OP4 of control circuit 208, and the buffer circuit 254 is connected to the third source of electrical power 228. One leg 256 of switching device 250 is also connected to the third source of electrical power 228. Buffer circuit 254, like buffer circuit 226, is provided to convert the low-level control signal voltage produced by control circuit 208 at output OP4 to a suitable activation voltage for driving the gate 252 of switching device 250 which has electrical power source 228 connected to leg 256 thereof. Device 254, like device 222, is preferably a p-channel MOSFET.

The other leg 258 of switching device 250 is connected to input 72 of engine brake solenoid 14. Switching device 254 may be included to provide for a boost voltage for engine brake solenoid 14, if desired, in order to minimize the peak current rise time of the engine brake load current Ib as discussed hereinabove with respect to the fuel injector load current Ia. Switching devices 234 and 250 are responsive to control signals provided by control circuit 208 at outputs OP3 and OP4 thereof to supply a load current Ib corresponding to that demanded by fuel injector solenoid 12.

The outputs 46 and 78 of fuel injector solenoid 12 and engine brake solenoid 14 respectively are connected to one leg 260 of a fifth switching device 262, preferably a MOS-type transistor, having a gate 264 connected to output OP5 of control circuit 208. The other leg 266 of switching device 262 is connected to one end of a resistor 268, the opposite end of which is connected to the ground reference. Leg 266 is further connected to a feedback input D3 of control circuit 208 via circuit path 270. A series connected forward biased diode 60 and zener diode 62 are connected between leg 260 and gate 264 of switching device 262, as discussed hereinabove, to provide inductive flyback protection for device 262.

In accordance with another preferred embodiment of the present invention, system 200 provides load driving capability for a number of inductive loads wherein a common low side drive is used to provide a current path from each of the inductive loads to ground reference. Switching devices 202 and 222 are responsive to control signals provided by control circuit 208 at outputs OP1 and OP2 thereof to supply current from electrical power sources 212 and 228 to the input 30 of fuel injector solenoid 12. Switching device 234 (and optionally switching device 250) is responsive to a control signal provided by control circuit 208 at output OP3 (and optionally OP4) thereof to supply current from electrical power source 212 (and optionally 228) to the input 72 of engine brake solenoid 14. Switching device 262 is responsive to a control signal provided by control circuit 208 at output OP5 to provide a current path for either, or both of, the fuel injector solenoid current Ia and engine brake solenoid current Ib, through resistor 268 to the ground reference. Resistor 268, as with resistors 142 and 154 of FIG. 6, is included to provide a voltage to feedback input D3 that is proportional to the currents Ia and Ib, or combination thereof, flowing therethrough. By multiplexing the low-side switching device 262, system 200 provides a reduction in switching devices over known inductive load driving systems.

The system 200 of FIG. 7 may be used to control current flow through fuel injector solenoid 12 and engine brake solenoid 14 according to any of the four general solenoid control/drive examples illustrated in FIGS. 2-5. Those skilled in the art will recognize that while MOS-type transistors are preferably used as the switching devices 202, 222, 234, 250 (optionally) and 262, such switching devices may be alternatively be provided as bipolar transistors, junction field effect transistors (JFETs) or hybrid type transistors such as insulated gate bipolar transistors (IGBTs), or as any other known switching devices, wherein such switching devices are designed or chosen such that they are capable of handling load currents Ia and Ib. Control circuit 208 is preferably a circuit or subsystem responsive to a number of operational conditions associated with the engine to provide control signals at outputs OP1-OP5 indicative of fuel injector and engine brake operation. Control circuit 208 may be, or include, for example an interface circuit responsive to a control circuit connected thereto, a logic circuit responsive to a number of control signals, or a microprocessor-based control circuit, such as a vehicle and/or engine control computer, operable to process engine operational data and produce control signals in accordance therewith at outputs OP1–OP5.

Figure 8:
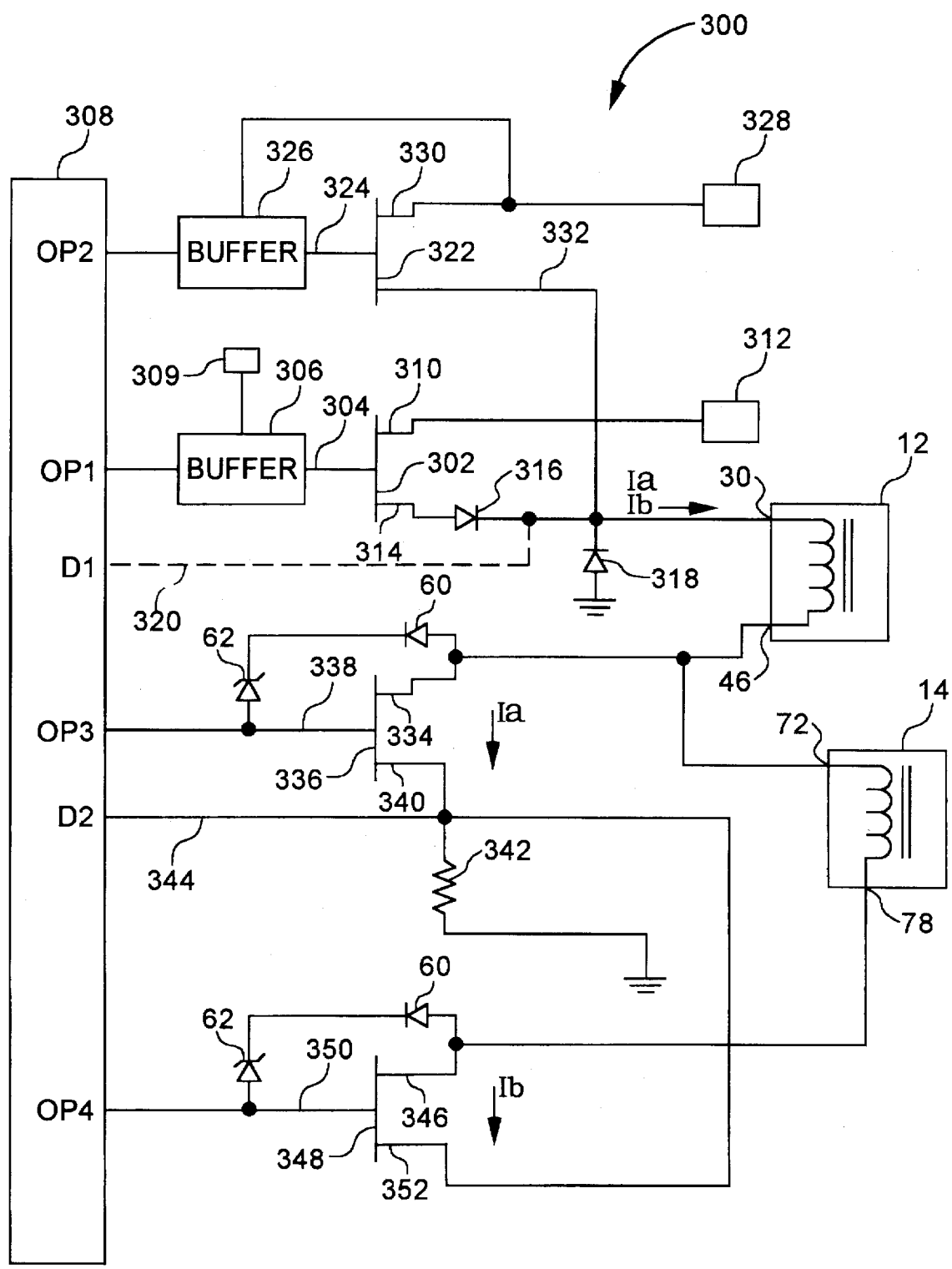
FIG. 8 illustrates a circuit diagram of yet another alternate embodiment of an inductive load driver system in accordance with the present invention.

Referring now to FIG. 8, yet another preferred embodiment of load driver system 300 for integrally controlling current flow through a number of inductive loads, in accordance with the present invention, is shown. System 300 includes a first inductive load 12, preferably a fuel injector solenoid, having a load input 30 and a load output 46, and a second inductive load 14, preferably an engine brake solenoid, having a load input 72 and a load output 78. As will be described in greater detail hereinafter, load driver system 300 is operable to drive the fuel injector solenoid 12 and engine brake solenoid 14 only in accordance with the signal overlap case illustrated in FIG. 5.

System 300 further includes a first switching device 302, preferably a MOS-type transistor, having a gate 304 connected to an output of a buffer circuit 306. An input of the buffer circuit 306 is connected to an output OP1 of a control circuit 308, and the buffer circuit 306 is connected to a first source of electrical power 309. One leg 310 of switching device 302 is connected to a second source of electrical power 312, which is preferably an automotive battery operable to produce battery voltages in the range of between approximately 7–24 volts. It is to be understood, however, that power source 312 may be any known power source capable of driving solenoids 12 and 14.

Buffer circuit 306 is provided to convert the low-level control signal voltage produced by control circuit 308 at output OP1 to a suitable activation voltage for driving the gate 304 of switching device 302 which has electrical power source 312 connected to leg 310 thereof. Device 302 is preferably an n-channel MOSFET, and the source of electrical power 309 must therefore provide a voltage slightly higher in value than the voltage provided by electrical power source 312, as is known in the art, to suitably drive gate 304 of switching device 302.

The other leg 314 of switching device 302 is connected to an anode of a blocking diode 316, the cathode of which is connected to input 30 of fuel injector solenoid 12. Input 30 is also connected to the cathode of a recirculating diode 318, the anode of which is connected to a ground reference, and optionally to a diagnostics input D1 of control circuit 308 via circuit path 320 which is shown in phantom. Via circuit path 320, control circuit 308 is thus operable to monitor at input D1 the voltage present at input 30 of fuel injector solenoid 12.

System 300 further includes a second switching device 322, preferably a MOS-type transistor, having a gate 324 connected to an output of another buffer circuit 326. An input of the buffer circuit 326 is connected to an output OP2 of control circuit 308, and the buffer circuit 326 is connected to a third source of electrical power 328. One leg 330 of switching device 322 is also connected to the third source of electrical power 328. Preferably, the third source of electrical power produces a boost voltage having a value much larger than that of the second source of electrical power 312, and which may be produced by a charged capacitor or other voltage source. In one embodiment, the third source of electrical power produces a voltage of at least 100 volts.

Buffer circuit 326, like buffer circuit 306, is provided to convert the low-level control signal voltage produced by control circuit 308 at output OP2 to a suitable activation voltage for driving the gate 324 of switching device 322 which has electrical power source 328 connected to leg 330 thereof. Device 322 is preferably a p-channel MOSFET, and the gate 324 thereof must therefore have a gate voltage of at least the boost voltage in order to drive switching device 322 to an off state.

The other leg 332 of switching device 322 is connected to input 30 of fuel injector solenoid 12. As discussed in the BACKGROUND section, switching device 322 is provided to supply a boost voltage to fuel injector solenoid 12 at least during initial ramping of the load current therethrough, in order to minimize the peak current rise time as is known in the art. An added benefit of the system 300 of the present invention is that the boost voltage provided by switching device 322 may also be applied to the engine brake solenoid 14, such as when device 336 is in a deactivated state.

Switching devices 302 and 322 are responsive to control signals provided by control circuit 308 at outputs OP1 and OP2 thereof to supply a load current having a maximum value of Ia+Ib, corresponding to the load current Ia demanded by fuel injector solenoid 12 plus the load current Ib demanded by engine brake solenoid 14. As with system 100 of FIG. 6, by multiplexing the high-side switching devices 302 and 322, system 300 provides a reduction in switching devices over known inductive load driving systems, and provides the further benefit of making a boost voltage available to engine brake solenoid 14.

The output 46 of fuel injector solenoid 12 is connected to input 72 of engine brake solenoid 14 and to one leg 334 of a third switching device 136, preferably a MOS-type transistor, having a gate 338 connected to output OP3 of control circuit 308. The other leg 340 of switching device 336 is connected to one end of a resistor 342, the opposite end of which is connected to the ground reference. Leg 340 is further connected to a feedback input D2 of control circuit 308 via circuit path 344. A series connected forward biased diode 60 and zener diode 62 are connected between leg 334 and gate 338 of switching device 336, as discussed hereinabove, to provide inductive flyback protection for device 336.

The output 78 of engine brake solenoid 14 is connected to one leg 346 of a fourth switching device 348, preferably a MOS-type transistor, having a gate 350 connected to output OP4 of control circuit 308. The other leg 352 of switching device 348 is connected leg 340 of switching device 336. A series connected forward biased diode 60 and reverse biased diode 62 are connected between leg 346 and gate 350 of switching device 348, as discussed hereinabove, to provide for inductive flyback protection.

In accordance with yet another preferred embodiment of the present invention, system 300 provides load driving capability for a number of inductive loads wherein a common high side drive is used to supply load current to a series combination o the inductive loads. Switching devices 302 and 322 are responsive to control signals provided by control circuit 308 at outputs OP1 and OP2 thereof to supply current from electrical power sources 312 and 328 to the input 30 of fuel injector solenoid 12. Switching device 336 is responsive to a control signal provided by control circuit 308 at output OP3 to provide a current path for the fuel injector solenoid current Ia through resistor 342 to the ground reference. Likewise, switching device 348 is responsive to a control signal provided by control circuit 308 at output OP4 to provide a current path for the engine brake solenoid current Ib through resistor 342 to the ground reference. Resistor 342 is included to provide a voltage to feedback input D2 that is proportional to the currents Ia and Ib respectively flowing therethrough.

The system 300 of FIG. 8 may be used to control current flow through fuel injector solenoid 12 and engine brake solenoid 14 according to only the general solenoid control/drive example illustrated in FIG. 5. It is to be understood that in controlling the solenoid currents Ia and Ib with system 300 in accordance with the control/drive example illustrated in FIG. 5, the active portion of engine brake signal 96 (between $t_{3-4}$) need not be coextensive with the times $t_1$ and $t_2$ of the fuel injector signal 94, but may rather occur anywhere therebetween. Those skilled in the art will recognize that while MOS-type transistors are preferably used as the switching devices 302, 322, 336 and 348, such switching devices may be alternatively be provided as bipolar transistors, junction field effect transistors (JFETs) or hybrid type transistors such as insulated gate bipolar transistors (IGBTs), or as any other known switching devices, wherein such switching devices are designed or chosen such that they are capable of handling load currents Ia and Ib. Control circuit 308 is preferably a circuit or subsystem responsive to a number of operational conditions associated with the engine to provide control signals at outputs OP1–OP4 indicative of fuel injector and engine brake operation. Control circuit 308 may be, or include, for example an interface circuit responsive to a control circuit connected thereto, a logic circuit responsive to a number of control signals, or a microprocessor-based control circuit, such as a vehicle and/or engine control computer, operable to process engine operational data and produce control signals in accordance therewith at outputs OP1–OP4.

While the present invention has been illustrated and described in detail in the drawings and foregoing description, the same is to be considered as illustrative and not restrictive in character, it being understood that only the preferred embodiments have been shown and described and that all changes and modifications that come within the spirit of the present invention are desired to be protected.

What is claimed is:

1. A system for integrally controlling current flow from a first source of electrical power through first and second inductive loads, comprising:
    a first switching device adapted for connection to the first source of electrical power and to inputs of the first and second inductive loads, said first switching device responsive to a first control signal to connect the first source of electrical power to the first and second inductive load inputs;
    a second switching device adapted for connection to an output of the first inductive load and coupled to a ground reference, said second switching device responsive to a second control signal to couple the first inductive load output to said ground reference; and
    a third switching device adapted for connection to an output of the second inductive load and coupled to the ground reference, said third switching device responsive to a third control signal to couple the second inductive load output to said ground reference.

2. The system of claim 1 further including a control circuit having a first output coupled to an input of said first switching device, said control circuit producing said first control signal at said first output thereof.

3. The system of claim 2 further including a buffer circuit having a first input connected to said first output of said control circuit and an output connected to said input of said first switching device, said buffer circuit responsive to said first control signal to drive said first switching device.

4. The system of claim 3 further including a forward biased diode adapted for connection between said first switching device the inputs of the first and second inductive loads.

5. The system of claim 4 further including a reverse biased diode adapted for connection between the inputs of the first and second inductive loads and said ground reference.

6. The system of claim 5 wherein said control circuit includes a diagnostics input adapted for connection to the inputs of the first and second inductive loads.

7. The system of claim 2 wherein said control circuit includes a second output connected to an input of said second switching device, said control circuit producing said second control signal at said second output thereof.

8. The system of claim 7 further including a resistor having a first end connected to said second switching device and a second end connected to said ground reference.

9. The system of claim 8 wherein said control circuit includes a diagnostics input connected to said first end of said resistor.

10. The system of claim 7 wherein said control circuit includes a third output connected to an input of said third switching device, said control circuit producing said third control signal at said third output thereof.

11. The system of claim 10 further including a resistor having a first end connected to said third switching device and a second end connected to said ground reference.

12. The system of claim 11 wherein said control circuit includes a diagnostics input connected to said first end of said resistor.

13. The system of claim 10 further including a fourth switching device adapted for connection to a second source of electrical power and to the inputs of the first and second inductive loads, said fourth switching device responsive to a fourth control signal to connect the second source of electrical power to the inputs of the first and second inductive loads.

14. The system of claim 13 wherein said control circuit includes a fourth output coupled to an input of said fourth switching device, said control circuit producing said fourth control signal at said fourth output thereof.

15. The system of claim 14 further including a buffer circuit having an input connected to said fourth output of said control circuit and an output connected to said input of said fourth switching device, said buffer circuit responsive to said fourth control signal to drive said fourth switching device.

16. The system of claim 14 wherein the first inductive load is a fuel injector solenoid of an internal combustion engine and the second inductive load is an engine brake solenoid of the internal combustion engine.

17. A system for integrally controlling current flow from a first source of electrical power through first and second inductive loads, comprising:
    a first switching device adapted for connection to the first source of electrical power and to an input of the first inductive load, said first switching device responsive to a first control signal to connect the first source of electrical power to the first inductive load input;
    a second switching device adapted for connection to the first source of electrical power and to an input of the second inductive load, said second switching device responsive to a second control signal to connect the first source of electrical power to the second inductive load input; and
    a third switching device adapted for connection to outputs of the first and second inductive loads and connected to a ground reference, said third switching device responsive to a third control signal to connect the first and second inductive load outputs to said ground reference.

18. The system of claim 17 further including a control circuit having a first output coupled to an input of said first switching device, said control circuit producing said first control signal at said first output thereof.

19. The system of claim 18 further including a first buffer circuit having a first input connected to said first output of said control circuit and an output connected to said input of said first switching device, said first buffer circuit responsive to said first control signal to drive said first switching device.

20. The system of claim 19 further including a forward biased diode adapted for connection between said first switching device the input of the first inductive load.

21. The system of claim 20 further including a reverse biased diode adapted for connection between the input of the first inductive load and said ground reference.

22. The system of claim 21 wherein said control circuit includes a diagnostics input adapted for connection to the input of the first inductive load.

23. The system of claim 19 wherein said control circuit includes a second output coupled to an input of said second switching device, said control circuit producing said second control signal at said second output thereof.

24. The system of claim 23 further including a second buffer circuit having an input connected to said second output of said control circuit and an output connected to said input of said second switching device, said second buffer circuit responsive to said second control signal to drive said second switching device.

25. The system of claim 24 further including a forward biased diode adapted for connection between said second switching device the input of the second inductive load.

26. The system of claim 25 further including a reverse biased diode adapted for connection between the input of the second inductive load and said ground reference.

27. The system of claim 26 wherein said control circuit includes a diagnostics input connected to the input of the second inductive load.

28. The system of claim 23 wherein said control circuit includes a third output connected to an input of said third switching device, said control circuit producing said third control signal at said third output thereof.

29. The system of claim 28 further including a resistor having a first end connected to said third switching device and a second end connected to said ground reference.

30. The system of claim 29 wherein said control circuit includes a diagnostics input connected to said first end of said resistor.

31. The system of claim 28 further including a fourth switching device adapted for connection to a second source of electrical power and to the input of the first inductive load, said fourth switching device responsive to a fourth control signal to connect the second source of electrical power to the input of the first inductive load.

32. The system of claim 31 wherein said control circuit includes a fourth output coupled to an input of said fourth switching device, said control circuit producing said fourth control signal at said fourth output thereof.

33. The system of claim 32 further including a third buffer circuit having an input connected to said fourth output of said control circuit and an output connected to said input of said fourth switching device, said third buffer circuit responsive to said fourth control signal to drive said fourth switching device.

34. The system of claim 33 further including a fifth switching device adapted for connection to the second source of electrical power and to the input of the second inductive load, said fifth switching device responsive to a fifth control signal to connect the second source of electrical power to the input of the second inductive load.

35. The system of claim 34 wherein said control circuit includes a fifth output coupled to an input of said fifth switching device, said control circuit producing said fifth control signal at said fifth output thereof.

36. The system of claim 35 further including a fourth buffer circuit having an input connected to said fifth output of said control circuit and an output connected to said input of said fifth switching device, said fourth buffer circuit responsive to said fifth control signal to drive said fifth switching device.

37. The system of claim 28 wherein the first inductive load is a fuel injector solenoid of an internal combustion engine and the second inductive load is an engine brake solenoid of the internal combustion engine.

38. A system for integrally controlling current flow from a first source of electrical power through first and second inductive loads, comprising:

a first switching device adapted for connection to the first source of electrical power and to an input of the first inductive load, said first switching device responsive to a first control signal to connect the first source of electrical power to the inductive load input;

a second switching device adapted for connection to an output of the first inductive load and an input of the second inductive load, and coupled to a ground reference, said second switching device responsive to a second control signal to couple the first inductive load output to said ground reference; and a third switching device adapted for connection to an output of the second inductive load and coupled to the ground reference, said third switching device responsive to a third control signal to couple the second inductive load output to said ground reference.

39. The system of claim 38 further including a control circuit having a first output coupled to an input of said first switching device, said control circuit producing said first control signal at said first output thereof.

40. The system of claim 39 further including a buffer circuit having a first input connected to said first output of said control circuit and an output connected to said input of said first switching device, said buffer circuit responsive to said first control signal to drive said first switching device.

41. The system of claim 40 further including a forward biased diode adapted for connection between said first switching device the input of the inductive load.

42. The system of claim 41 further including a reverse biased diode adapted for connection between the input of the first inductive load and said ground reference.

43. The system of claim 42 wherein said control circuit includes a diagnostics input adapted for connection to the input of the first inductive load.

44. The system of claim 39 wherein said control circuit includes a second output connected to an input of said second switching device, said control circuit producing said second control signal at said second output thereof.

45. The system of claim 44 further including a resistor having a first end connected to said second switching device and a second end connected to said ground reference.

46. The system of claim 45 wherein said control circuit includes a diagnostics input connected to said first end of said resistor.

47. The system of claim 45 wherein said control circuit includes a third output connected to an input of said third switching device, said control circuit producing said third control signal at said third output thereof.

48. The system of claim 47 wherein said third switching device is connected to said first end of said resistor.

49. The system of claim 47 further including a fourth switching device adapted for connection to a second source of electrical power and to the input of the first inductive load, said fourth switching device responsive to a fourth control signal to connect the second source of electrical power to the input of the first inductive load.

50. The system of claim 49 wherein said control circuit includes a fourth output coupled to an input of said fourth switching device, said control circuit producing said fourth control signal at said fourth output thereof.

51. The system of claim 50 further including a buffer circuit having an input connected to said fourth output of said control circuit and an output connected to said input of said fourth switching device, said buffer circuit responsive to said fourth control signal to drive said fourth switching device.

52. The system of claim 47 wherein the first inductive load is a fuel injector solenoid of an internal combustion engine and the second inductive load is an engine brake solenoid of the internal combustion engine.

53. A control system for cooperative arrangement with an internal combustion engine comprising:

a source of electrical power;

a ground reference;

first and second inductive loads associated with the engine having first and second inductive load inputs and first and second corresponding inductive load outputs; and a load driving circuit including three load driving devices, a first one of said load driving devices operably connected between said source of electrical power and said first and second inductive load inputs, a second one of said load driving devices operably connected between said first inductive load output and said ground reference, and a third one of said load driving devices operably connected between said second inductive load output and said ground reference, each of said three load driving devices responsive to a separate control signal to control current flow from said source of electrical power through said first and second inductive loads.

54. The control system of claim 53 further including:

a source of electrical boost power; and a fourth load driving device operably connected between said source of electrical boost power and said inductive load inputs, said fourth load driving device responsive to a control signal to control current flow from said source of electrical boost power through said first and second inductive loads.

55. The control system of claim 53 wherein said first inductive load is a fuel injector solenoid of an internal combustion engine and said second inductive load is an engine brake solenoid of the internal combustion engine.

56. A control system for cooperative arrangement with an internal combustion engine comprising:

a source of electrical power;

a ground reference;

first and second inductive loads associated with the engine having first and second inductive load inputs and first and second corresponding inductive load outputs; and a load driving circuit including three load driving devices, a first one of said load driving devices operably connected between said source of electrical power and said first inductive load input, a second one of said load driving devices operably connected between said source of electrical power and said second inductive load input, and a third one of said load driving devices operably connected between said first and second inductive load outputs and said ground reference, each of said three load driving devices responsive to a separate control signal to control current flow from said source of electrical power through said first and second inductive loads.

57. The control system of claim 56 further including:

a source of electrical boost power; and a fourth load driving device operably connected between said source of electrical boost power and said first inductive load input, said fourth load driving device responsive to a control signal to control current flow from said source of electrical boost power through said first inductive load.

58. The control system of claim 57 further including a fifth load driving device operably connected between said source of electrical boost power and said second inductive load input, said fifth load driving device responsive to a control signal to control current flow from said source of electrical boost power through said second inductive load.

59. The control system of claim 56 wherein said first inductive load is a fuel injector solenoid of an internal combustion engine and said second inductive load is an engine brake solenoid of the internal combustion engine.

60. A control system for cooperative arrangement with an internal combustion engine comprising:

a source of electrical power;

a ground reference;

first and second inductive loads associated with the engine having first and second inductive load inputs and first and second corresponding inductive load outputs, said first inductive load output connected to said second inductive load input; and a load driving circuit including three load driving devices, a first one of said load driving devices operably connected between said source of electrical power and said first inductive load input, a second one of said load driving devices operably connected between said first inductive load output and said ground reference, and a third one of said load driving devices operably connected between second inductive load output and said ground reference, each of said three load driving devices responsive to a separate control signal to control current flow from said source of electrical power through said first and second inductive loads.

61. The control system of claim 60 further including:

a source of electrical boost power; and a fourth load driving device operably connected between said source of electrical boost power and said first inductive load input, said fourth load driving device responsive to a control signal to control current flow from said source of electrical boost power through said first inductive load.

62. The control system of claim 60 wherein said first inductive load is a fuel injector solenoid of an internal combustion engine and said second inductive load is an engine brake solenoid of the internal combustion engine.

* * * * *

UNITED STATES PATENT AND TRADEMARK OFFICE
CERTIFICATE OF CORRECTION

PATENT NO : 5,752,482
DATED : May 19, 1998
INVENTOR(S): Leslie A. Roettgen, et al.

It is certified that error appears in the above-identified patent and that said Letters Patent is hereby corrected as shown below:

In Col. 10, at line 14, replace "OPS" with --OP5--.

In Col. 10, at line 39, replace "OPS" with --OP5--.

In Col. 13, at line 8, replace "$t_{3-4}$" with --$t_3 - t_4$--.

Signed and Sealed this

Twenty-first Day of July, 1998

Attest:

BRUCE LEHMAN

*Attesting Officer*    *Commissioner of Patents and Trademarks*